(12) United States Patent
Sugiyama et al.

(10) Patent No.: US 7,692,827 B2
(45) Date of Patent: Apr. 6, 2010

(54) IMAGE READING APPARATUS

(75) Inventors: Takayuki Sugiyama, Utsunomiya (JP); Tadao Hayashide, Utsunomiya (JP); Toshio Takahashi, Toda (JP)

(73) Assignee: Canon Kabushiki Kaisha, Tokyo (JP)

( * ) Notice: Subject to any disclaimer, the term of this patent is extended or adjusted under 35 U.S.C. 154(b) by 325 days.

(21) Appl. No.: 11/851,755

(22) Filed: Sep. 7, 2007

(65) Prior Publication Data
US 2008/0062475 A1 Mar. 13, 2008

(30) Foreign Application Priority Data
Sep. 8, 2006 (JP) .............................. 2006-243939

(51) Int. Cl.
*H04N 1/04* (2006.01)
(52) U.S. Cl. ....................... 358/497; 358/474; 358/475; 358/482; 358/483; 359/850
(58) Field of Classification Search ................. 358/475, 358/474, 497, 494, 483, 482, 505, 509, 512–514; 250/208.1, 239, 216, 234–236; 399/211; 359/850, 857, 861, 838, 196.1
See application file for complete search history.

(56) References Cited

U.S. PATENT DOCUMENTS

| | | | |
|---|---|---|---|
| 4,713,698 A | 12/1987 | Takahashi et al. | 358/296 |
| 4,786,971 A | 11/1988 | Kaneko et al. | 358/209 |
| 5,585,937 A * | 12/1996 | Kokubo et al. | 358/451 |
| 5,917,620 A | 6/1999 | Hasegawa et al. | 358/513 |
| 5,936,223 A | 8/1999 | Suzuki et al. | 235/462.01 |
| 6,172,784 B1 | 1/2001 | Konda | 359/196 |
| 6,462,866 B1 | 10/2002 | Sugiyama et al. | 359/359 |
| 6,493,061 B1 | 12/2002 | Arita et al. | 355/41 |
| 6,631,014 B1 | 10/2003 | Aoshima et al. | 358/497 |
| 6,717,702 B1 | 4/2004 | Yamauchi et al. | 358/497 |
| 7,021,541 B2 | 4/2006 | Hayashide | 235/454 |
| 7,529,000 B2 * | 5/2009 | Ishida et al. | 358/474 |

FOREIGN PATENT DOCUMENTS

| | | | |
|---|---|---|---|
| JP | 2000-50031 | | 2/2000 |
| JP | 2001-174932 | | 6/2001 |
| JP | 2001174932 A | * | 6/2001 |

* cited by examiner

*Primary Examiner*—Cheukfan Lee
(74) *Attorney, Agent, or Firm*—Fitzpatrick, Cella, Harper & Scinto

(57) ABSTRACT

An image reading apparatus including a light source for illuminating an original, a plurality of mirrors for reflecting a light beam from the original illuminated by the light source, a reading device, an imaging optical system for imaging a light beam reflected by the mirrors, upon the reading device, and a scanning optical system unit which integrally accommodates theses components therein and moves in a sub-scan direction to read imagewise information of the original, wherein, in a sub-scan section, one mirror optically closest to the surface of the original is disposed in an end portion of the scanning optical system unit in the sub-scan direction, as compared with the other mirrors, and wherein the central portion of the reflection surface of one mirror optically closest to the original is disposed in a space between the central portion of the reflection surface of a mirror optically closest to the light entrance surface of the imaging optical system and central portions reflection surfaces of other mirrors.

5 Claims, 3 Drawing Sheets

PRIOR ART

IMAGE READING APPARATUS

FIELD OF THE INVENTION AND RELATED ART

This invention relates to an image reading apparatus. More particularly, the invention concerns an image reading apparatus suitably usable in an image scanner or digital copying machine, for example, in which imagewise information of an original is read by use of an integral scanning optical system including light source means, mirrors, imaging optical system and reading means.

Various proposals have conventionally been made with regard to image reading apparatuses such as image scanner or digital copying machine.

FIG. 5 is a schematic diagram of a main portion of an image reading apparatus having an integral scanning optical system unit.

The integral scanning optical system unit 507 (which hereinafter will be referred to also as "carriage") shown in the drawing comprises a line sensor 505 which functions to read a light beam from an original 501, being illuminated by light source means 503 configured to illuminate the original 501 placed on an original table glass (original table) 502. Furthermore, it comprises a plurality of scanning mirrors 504a-504d for directing the light beam from the original 501 to a line sensor 505, and an imaging lens 506 for imaging the light beam based on the imagewise information of the original 501, upon the surface of the line sensors 505.

The carriage 507 so structured as described is sub-scanned by a sub-scan motor 508 as the driving means, in a direction of an arrow A shown in the drawing. The components that constitute the integral scanning optical system unit 507 operate to scan the original while their relative positional relationship is kept unchanged.

In the drawing, the plural mirrors include a first mirror 504a, second mirror 504b, third mirror 504c, and fourth mirror 504d. These mirrors are so disposed that the light beam from the original 501 is incident on the first mirror 504a and is directed from the first mirror 504a to the second mirror 504b, from the second mirror 504b to the third mirror 504c, and then from the third mirror 504c to the fourth mirror 504d, sequentially. Then, the light beam incident on the fourth mirror 504d is subsequently incident on the imaging lens 506 and, thereafter, it is imaged on the line sensor 505 surface.

In such structure, the imagewise information of the original read by the line sensor 505 is sent to a predetermined image processing component (not shown) as an electrical signal and, after a predetermined signal processing is carried out thereto, the signal is outputted. The image reading apparatus further comprises a power supply unit (not shown) for driving this device.

Conventionally, in this type of image reading apparatuses, downsizing of the carriage 507 has been eagerly desired. Particularly, since the thickness (height) of the apparatus body is decreasing in recent years, downsizing of the carriage with respect to the vertical direction (the direction of a normal to the original surface 101) is very strongly desired. As a solution for such requirements, there may be a method in which the field angle (view angle) of the imaging lens is widened to thereby shorten the optical path length from the original to the line sensor, or a method in which the number of mirror reflections or the number of used mirrors is increased to thereby reduce the size of the carriage.

However, if the field angle of the imaging lens is widened, it causes a decrease of the peripheral light quantity in proportion to the cosine 4-th power rule of the incidence field angle of the imaging lens. Therefore, an intense illumination source is required. Furthermore, since the aberration of the imaging lens is magnified, there would be a problem that accurate image reading of the line sensor corresponding to the image of the original becomes difficult to achieve.

On the other hand, several proposals have been made with regard to image reading apparatuses in which downsizing of the whole carriage is attempted by increasing the number of mirror reflections or the number of used mirrors (see patent documents Nos. 1 and 2).

In patent document No. 1, first and second mirrors of plural mirrors are comprised of a multiple reflection mirror, and the downsizing of the whole carriage is realized by increasing the number of reflections based on the multiple reflections of the first and second mirrors.

In patent document No. 2, downsizing of the whole carriage is realized by bending the light path at the original surface 101 side of the imaging lens.

[Patent Documents]
1. Japanese Laid-Open Patent Application No. 2001-174932
2. Japanese Laid-Open Patent Application No. 2000-50031

In patent document No. 1, although the carriage may be downsized easily, the mirrors which provide multiple reflections are liable to be bulky.

In patent document No. 2, the structure may be effectively downsized with respect to the lateral direction. However, the length in the vertical direction will be enlarged as compared with the length in the lateral direction.

The present invention provides an image reading apparatus by which an integral scanning optical system can be downsized and yet the size of the apparatus as a whole can be made small as well.

In accordance with an aspect of the present invention, there is provided an image reading apparatus, comprising: light source means for illuminating a surface of an original; a plurality of mirrors for reflecting a light beam from the original illuminated by said light source means; reading means; an imaging optical system for imaging a light beam reflected by said mirrors, upon said reading means; and a scanning optical system unit which integrally accommodates said light source means, said mirrors, said reading means and said imaging optical system therein, said scanning optical system being configured to move in a sub-scan direction to read imagewise information of the original; wherein, in a sub-scan section, one of said mirrors which is optically closest to the surface of the original is disposed in an end portion of said scanning optical system unit with respect to the sub-scan direction, as compared with the other mirrors, and wherein, in the sub-scan section, a central portion of a reflection surface of one of said mirrors which is optically closest to the surface of the original is disposed in a space between (i) a central portion of a reflection surface of one of said mirrors which is optically closest to said imaging optical system with respect to a direction orthogonal to a main-scan direction and the sub-scan direction of the surface of the original and which is disposed before a light entrance surface of said imaging optical system and (ii) central portions reflection surfaces of other mirrors.

In one preferred form of this aspect of the present invention, the mirrors include a first mirror, a second mirror, a third mirror and a fourth mirror, and wherein said first to fourth mirrors are so disposed that, in the sub-scan section, a light beam from the original is reflected by said first mirror and is subsequently incident on said second mirror, that a light beam reflected by said second mirror is incident on said third mirror, that a light beam reflected by said third mirror crosses a light path between said first mirror and said second mirror and is subsequently incident on said fourth mirror, and that a light beam reflected by said fourth mirror is incident on said imaging optical system.

The mirrors may include a first mirror, a second mirror, a third mirror and a fourth mirror, and said first to fourth mirrors may be so disposed that, in the sub-scan section, a light beam from the original is reflected by said first mirror and is subsequently incident on said second mirror, that a light beam reflected by said second mirror is incident on said third mirror, that a light beam reflected by said third mirror is again incident on said second mirror, that a light beam thus reflected by said second mirror is incident on said fourth mirror, that a light beam reflected by said fourth mirror crosses a light path between said first mirror and said second mirror and is again incident on said third mirror, and that a light beam thus reflected by said third mirror is incident on said imaging optical system.

When, with respect to the sub-scan section, a physical distance from the surface of the original to a center of said light source means is denoted by $a$ (mm), a physical distance from the surface of the original to a center of the reflection surface of one of said mirrors which is optically closest to the surface of the original is denoted by b (mm), a physical distance from the surface of the original to a center of the reflection surface of one of said mirrors which is physically closest to the surface of the original is denoted by c (mm), and a distance from the surface of the original to a center of the reflection surface of one of said mirrors which is physically furthermost therefrom with respect to a direction orthogonal to the main-scan direction and the sub-scan direction is denoted by d (mm), said mirrors may be disposed to satisfy the following relations:

$a<c<b<d$ $0.3<a/b<0.4$ $0.2<a/d<0.3$ $d<35.0mm$

In the sub-scan section, the reflection surface of one of said mirrors which is optically closest to the surface of the original may be disposed physically further from the surface of the original, than a plane which contains the reflection surface of one of said mirrors which is physically furthermost from the surface of the original with respect to a direction orthogonal to the main-scan direction and the sub-scan direction is.

In the sub-scan section, said fourth mirror and said imaging optical system may be physically further from the surface of the original, with respect to a direction orthogonal to the main-scan direction and the sub-scan direction, than said first mirror, said second mirror and sand third mirror are.

In the sub-scan section, said fourth mirror and said imaging optical system may be physically closer to the surface of the original, with respect to a direction orthogonal to the main-scan direction and the sub-scan direction, than said first mirror, said second mirror and sand third mirror are.

In the sub-scan section, said third mirror and said imaging optical system may be physically further from the surface of the original, with respect to a direction orthogonal to the main-scan direction and the sub-scan direction, than said first mirror, said second mirror and sand fourth mirror are.

In accordance with the present invention, the size of the integral scanning optical system unit in the vertical direction can be reduced while securing a sufficient space for placing an illumination system. Thus, an image reading apparatus by which the overall size of the apparatus is reduced is accomplished.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Preferred embodiments of the present invention will now be described with reference to the attached drawings.

In this specification, the term "optical spacing" refers to the spacing (optical path length) with respect to the direction of advancement of light. Furthermore, in this specification, the term "physical spacing" refers to the spacing which is defined in the sub-scan section and which is measured in a direction perpendicular to the main-scan direction and sub-scan direction.

Embodiment 1

Figure 1:
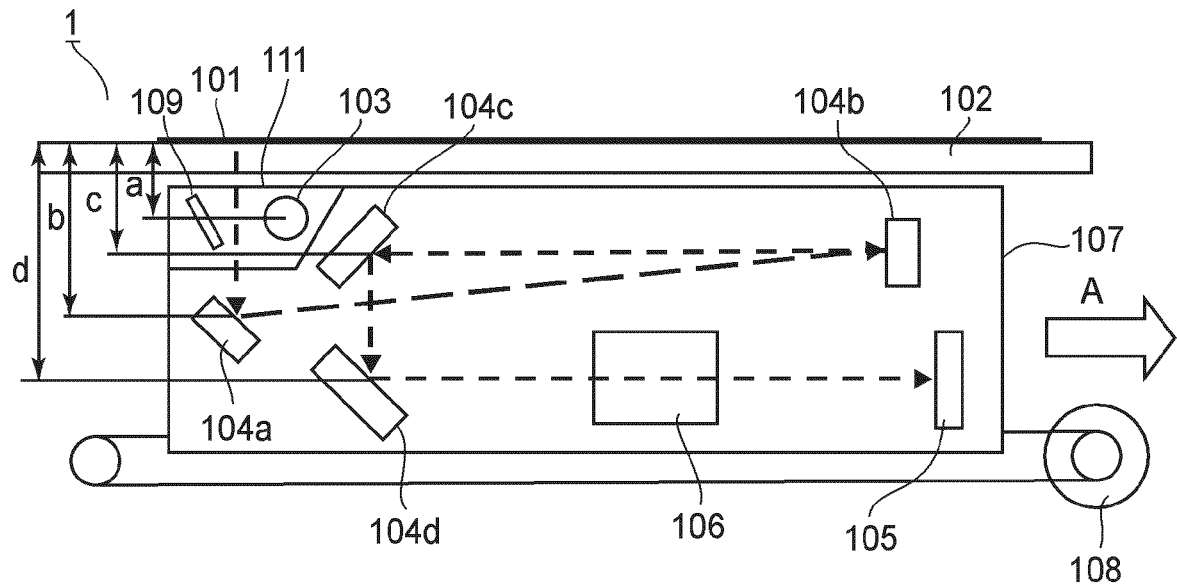
FIG. 1 is schematic diagram of a main portion of an image reading apparatus according to a first embodiment of the present invention.

FIG. 1 is a schematic diagram of a main portion of an image reading apparatus according to a first embodiment of the present invention. In this embodiment, the image reading apparatus of the present invention is applied to an image scanner.

It is to be noted that, in the following description, the lateral direction of a carriage 107 refers to the direction in which the carriage 107 is driven by driving means (sub-scan motor) 108, and it is equivalent to the sub-scan direction. Furthermore, the vertical direction of the carriages refers to the direction of a normal to the surface of an original 101. Here, the upward direction means the direction toward the original surface 101, and the downward direction means the reverse direction thereof. The main-scan direction refers to the direction in which picture elements of reading means 105 are arrayed (i.e., a direction perpendicular to the sheet of the drawing).

Denoted in FIG. 1 at 1 is a main body of the image reading apparatus, and denoted at 102 is an original table (original table glass). An original (original surface) 101 is placed on the original table 102 surface. Denoted at 107 is an integral scanning optical system unit in which light source means 103, a plurality of scanning mirrors 104a-104d, imaging optical system 106 and reading means 105, and so on, to be described later, are accommodated. The integral scanning optical system unit 107 is configured to scan the original surface 101 in the sub-scan direction (the direction of an arrow A in FIG. 1) based on driving means 108 such as a motor, for example, by which imagewise information of the original 101 is read through the reading means 105.

It is to be noted that at least one of the integral scanning optical system unit 107 and the original 101 may be moved and, based on relative movement of them, the imagewise information of the original 101 may be read. The integral scanning optical system unit 107 will hereinafter be referred to also as "carriage".

Denoted at 103 is light source means which comprises a fluorescent lamp or a halogen lamp, for example. Denoted at 104a, 104b, 104c and 104d are first, second, third and fourth mirrors, respectively. These mirrors are disposed at positions to be described later. These mirrors function to reflect the light beam from the original 101. Denoted at 106 is an imaging lens as an imaging optical system, which functions to image the light beam based on the imagewise information of the original 101, upon the reading means 105 surface. Denoted at 105 is a charge coupled device such as a line sensor or image sensor, for example, as the reading means. The picture elements of the reading means 105 are arrayed in the main-scan direction (the direction perpendicular to the sheet of the drawing).

Denoted at 108 is a sub-scan motor as driving means, which serves to move the carriage 107 in the sub-scan direction. The sub-scan motor 108 is disposed, in the sub-scan section, at the scan end side (right-hand side as viewed in the drawing).

The plural scanning mirrors include four mirrors of first, second, third and fourth mirrors 104a, 104b, 104c and 104d. In this embodiment, these mirrors are so disposed that the light beam from the original 101 is first reflected by the first mirror 104a and it is incident on the second mirror 104b afterwards, and that the light beam reflected by the second mirror 104b is incident on the third mirror 104c. Furthermore, these mirrors are so disposed that the light beam reflected by the third mirror 104c crosses the light path between the first mirror 104a and the second mirror 104b and, thereafter, it is incident on the fourth mirror 104d, and that the light beam reflected by the fourth mirror 104d is incident on the imaging lens 106.

Furthermore, in this embodiment, among the plural mirrors, the first mirror 104a which is optically closest to the original surface 101 is disposed at the left-hand side end (end portion) of the carriage 107 with respect to the sub-scan section. Furthermore, the central portion of the reflection surface of the first mirror 104a is disposed, with respect to the vertical direction, in the space between (i) the central portion of the reflection surface of the fourth mirror 104d which is optically closest to the light entrance surface of the imaging lens 106 and in front thereof and (ii) the central portions of the reflection surfaces of the second and third mirrors 104b and 104c.

Furthermore, in the present embodiment, the fourth mirror 104d and the imaging lens 106 are disposed physically lower than the first, second and third mirrors 104a, 104b and 104c. Namely, the fourth mirror 104d and the imaging lens 106 are placed at a side further remote from the original surface 101.

In the present embodiment, the light beam emitted from the illumination system 111 which includes light source means 103 placed at the left-hand end inside the carriage 107 illuminates the bottom face of the original 101. A portion of diffused light beams from the original 101 advances vertically downwardly (going down) as viewed in FIG. 1. The light beam advancing vertically downwardly is incident on the first mirror 104a disposed at the left-hand end of the carriage 107. The light beam incident on the first mirror 104a is reflected thereby at a predetermined angle, rightwardly and upwardly in the carriage 107, and it is incident on the second mirror 104b which is placed at the upper right end of the carriage 107. The light beam thus incident on the second mirror 104b is reflected thereby at a predetermined angle, leftwardly of the carriage 107, and it is incident on the third mirror 104c which is placed at the right-hand side of the light source means 103. The light beam incident on the third mirror 104c is reflected thereby at a predetermined angle, downwardly of the carriage 107 so as to cross the light path between the first mirror 104a and the second mirror 104b. Then, it is incident on the fourth mirror 104d which is placed at the lower end of the carriage 107.

The light beam incident on the fourth mirror 104d placed at the lower end of the carriage 107 is reflected thereby horizontally with respect to the original surface 101, and then it is imaged on the line sensor 105 surface by the imaging lens 106. By moving the carriage 107 in the direction of an arrow A (sub-scan direction) shown in FIG. 1, the imagewise information of the original 101 is read.

The carriage 107 of the present embodiment is so structured that the illumination system 111 including the light source means 103 and the mirror 109 is disposed in an end portion of the carriage 107. As a result, in the sub-scan section, a mirror can be placed in a laterally extending space of the illumination system 111. Hence, the distance from the first mirror 104a to the second mirror 104b as well as the distance from the second mirror 104b to the third mirror 104c can be lengthened, and the vertical size of the carriage 107 can be shortened.

Now, it is assumed in the present embodiment that, in the sub-scan section, the distance from the original surface 101 to the center of light source means 103 is a (mm), the distance from the original surface 101 to the center of the reflection surface of the mirror 104a which is optically closest to the original surface 101 is b (mm). Furthermore, it is assumed that the distance from the original surface 101 to the center of the reflection surface of the mirror 104c which is physically closest to the original surface 101 is c (mm), and the distance from the original surface 101 to the center of the reflection surface of the mirror 104d which is physically lowermost (furthermost) is d (mm).

Here, the mirrors are disposed to satisfy the following conditions.

$$a<c<b<d \tag{1}$$

$$0.3<a/b<0.4 \tag{2}$$

$$0.2<a/d<0.3 \tag{3}$$

$$d<35.0mm \tag{4}$$

The conditional expressions (1)-(4) are conditions for setting the position and distance of the mirrors. All the conditional expressions (1)-(4) should be satisfied because, if one or more of them are unsatisfied, downsizing of the whole carriage becomes difficult to accomplish.

In the present embodiment, a=7.7 mm, b=21.8 mm, c=14.0 mm and d=29.0 mm. If these values are substituted into conditional expressions (1)-(4), it follows that:

| | |
|---|---|
| a<c<b<d=7.7mm<14.0mm<21.8mm<29.0 mm | Conditional expression (1) |
| a/b=0.35 | Conditional expression (2) |
| a/d=0.27 | Conditional expression (3) |
| d=29.0mm | Conditional expression (4) |

Thus, all of these satisfy the conditional expressions (1)-(4).

More preferably, in the present embodiment, the conditional expressions (2)-(4) had better be set as follows:

$$0.33 < a/b < 0.38 \tag{2a}$$

$$0.21 < a/d < 0.29 \tag{3a}$$

$$25\text{mm} < d \leqq 34\text{mm} \tag{4a}$$

Figure 2:
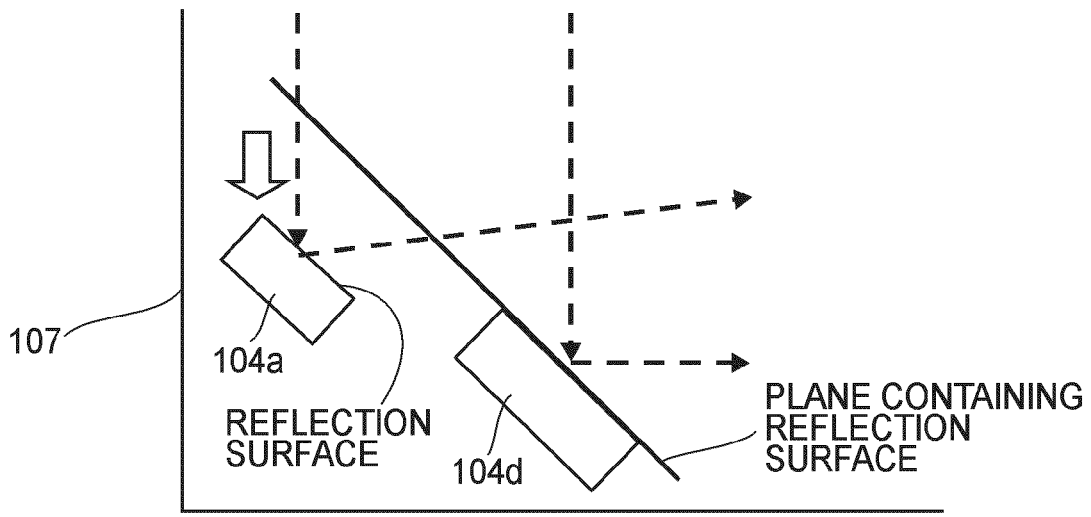
FIG. 2 is an enlarged view for explaining disposition of mirrors in the first embodiment of the present invention.

Furthermore, in the present embodiment, as shown in FIG. 2 the reflection surface of the first mirror 104a is disposed further from the original surface 101 in the sub-scan section, than the plane that contains the reflection surface of the fourth mirror 104d disposed physically at the lowermost of the carriage 107 is. Here, FIG. 2 is an enlarged schematic diagram illustrating the disposition of the first mirror 104a and the fourth mirror 104d.

In this embodiment, by disposing the first mirror 104a and the fourth mirror 104d in the manner as described above, it is assured that the scattered light other than the reflected light from the original 101 to be incident on the first mirror 104a, is blocked by the back surface of the fourth mirror 104d. Therefore, in this embodiment, scattered light that causes ghost or flare can be reduced significantly.

Hence, in accordance with the present embodiment as described above, in an image reading apparatus having such a carriage 107 as explained above, the disposition of components thereof including plural mirrors is set appropriately. Based on this, downsizing of the carriage 107, particularly, downsizing thereof with respect to the vertical direction, is accomplished. Also, downsizing of the overall system is achieved.

It is to be noted here that, although in this embodiment the first mirror 104a which is optically closest to the original surface 101 is disposed at the left-hand side end of the carriage 107 in sub-scan section, an inverted structure may be used. Namely, the mirror may be disposed at the right-hand end of the carriage 107.

Furthermore, the imaging optical system 106 is not limited to a lens. It may include a reflection curved surface or it may be constituted only by reflection curved surfaces.

Embodiment 2

Figure 3:
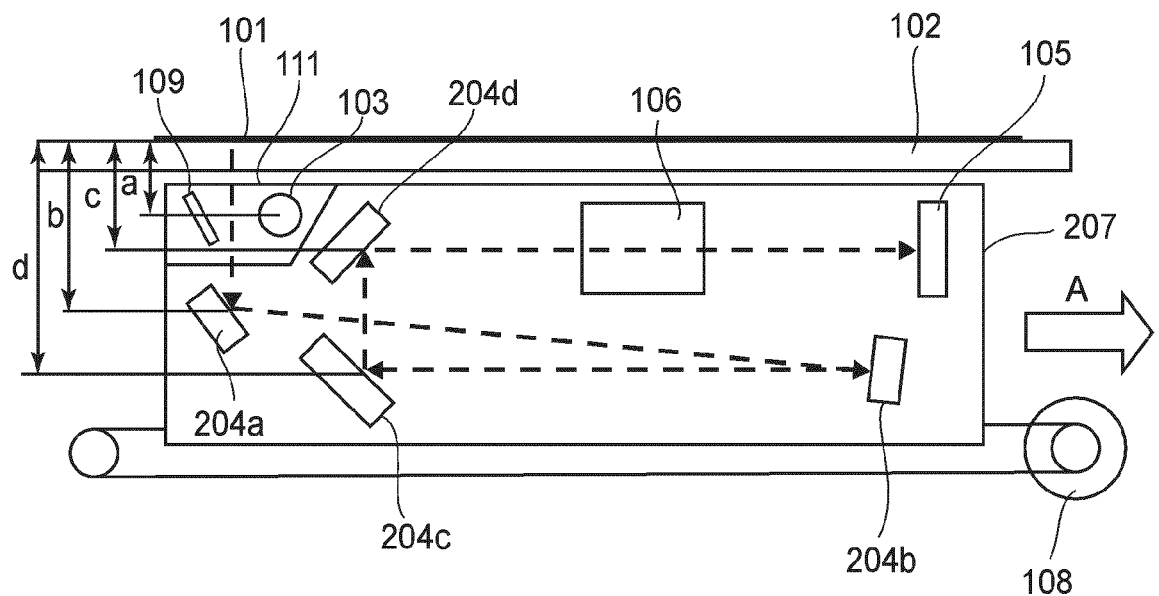
FIG. 3 is schematic diagram of a main portion of an image reading apparatus according to a second embodiment of the present invention.

FIG. 3 is a schematic diagram of a main portion of an image reading apparatus according to a second embodiment of the present invention. In this embodiment, the image reading apparatus of the present invention is applied to an image scanner. In FIG. 3, like numerals are assigned to components corresponding to those of FIG. 1.

The present embodiment differs from the abovementioned first embodiment in that the second mirror 204b and the third mirror 204c are disposed in the lowermost portion of the carriage 207, and that the carriage 207 is structured by disposing the fourth mirror 204d and the imaging lens 206 at the original surface 101 side. Other structures and optical functions are similar to those of the first embodiment and, based on this, similar advantageous effects are obtainable.

In the present embodiment, the plural scanning mirrors include four mirrors of first, second, third and fourth mirrors 204a, 204b, 204c and 204d. In this embodiment, these mirrors are so disposed that the light beam from the original 101 is first reflected by the first mirror 204a and it is incident on the second mirror 204b afterwards, and that the light beam reflected by the second mirror 204b is incident on the third mirror 204c. Furthermore, these mirrors are so disposed that the light beam reflected by the third mirror 204c crosses the light path between the first mirror 204a and the second mirror 204b and, thereafter, it is incident on the fourth mirror 204d, and that the light beam reflected by the fourth mirror 204d is incident on the imaging lens 106.

Furthermore, in this embodiment, among the plural mirrors, the first mirror 204a which is optically closest to the original surface 101 is disposed at the left-hand side end (end portion) of the carriage 207 with respect to the sub-scan section. Furthermore, the central portion of the reflection surface of the first mirror 204a is disposed, with respect to the vertical direction, in the space between (i) the central portion of the reflection surface of the fourth mirror 204d which is optically closest to the light entrance surface of the imaging lens 106 and in front thereof and (ii) the central portions of the reflection surfaces of the second and third mirrors 204b and 204c.

Furthermore, in the present embodiment, the fourth mirror 204d and the imaging lens 106 are disposed physically upper (original surface 101 side) than the first, second and third mirrors 204a, 204b and 204c.

In the present embodiment, the light beam emitted from the illumination system 111 which includes light source means 103 placed at the left-hand end inside the carriage 207 and a mirror 109, illuminates the bottom face of the original 101. A portion of diffused light beams from the original 101 advances vertically downwardly as viewed in FIG. 3. The light beam advancing vertically downwardly is incident on the first mirror 204a disposed at the left-hand end of the carriage 207. The light beam incident on the first mirror 204a is reflected thereby at a predetermined angle, rightwardly and downwardly in the carriage 107, and it is incident on the second mirror 204b which is placed in the lower right end portion of the carriage 207. The light beam thus incident on the second mirror 204b is reflected thereby at a predetermined angle, leftwardly of the carriage 207, and it is incident on the third mirror 204c which is placed in the lower left portion of the carriage 207. The light beam incident on the third mirror 104c is reflected thereby at a predetermined angle, upwardly of the carriage 207, and it is incident on the fourth mirror 204d which is disposed at the right-hand side of the light source means 103. The light beam thus incident on the fourth mirror 204d which is disposed at the right-hand side of the light source means 103, is reflected thereby horizontally with respect to the original surface 101 and, then, it is imaged on the line sensor 105 surface by the imaging lens 106. By moving the carriage 207 in the direction of an arrow A (sub-scan direction) shown in FIG. 3, the imagewise information of the original 101 is read.

In this embodiment, like the previously described first embodiment, the mirrors are so disposed as to satisfy the conditional expressions (1)-(4). Specifically, in the present embodiment, a=7.7 mm, b=21.8 mm, c=14.0 mm and d=29.0 mm. If these values are substituted into the abovementioned conditional expression (1)-(4), it follows that:

a<c<b<d=7.7mm<14.0mm<21.8mm<29.0 mm     Conditional expression (1)

a/b=0.35     Conditional expression (2)

a/d=0.27     Conditional expression (3)

d=29.0mm     Conditional expression (4)

Thus, all of the conditional expressions (1)-(4) are satisfied.

Furthermore, in the present embodiment, the reflection surface of the first mirror 204a is disposed further from the original surface 101 in the sub-scan section, than the plane which contains the reflection surface of the third mirror 204c disposed at the lowermost portion of the carriage 207 is.

Hence, in accordance with the present embodiment as described above, in an image reading apparatus having such a carriage 207 as explained above, the disposition of components thereof including plural mirrors is set appropriately. Based on this, downsizing of the carriage 207, particularly, downsizing thereof with respect to the vertical direction, is accomplished. Also, downsizing of the overall system is achieved.

Embodiment 3

Figure 4:
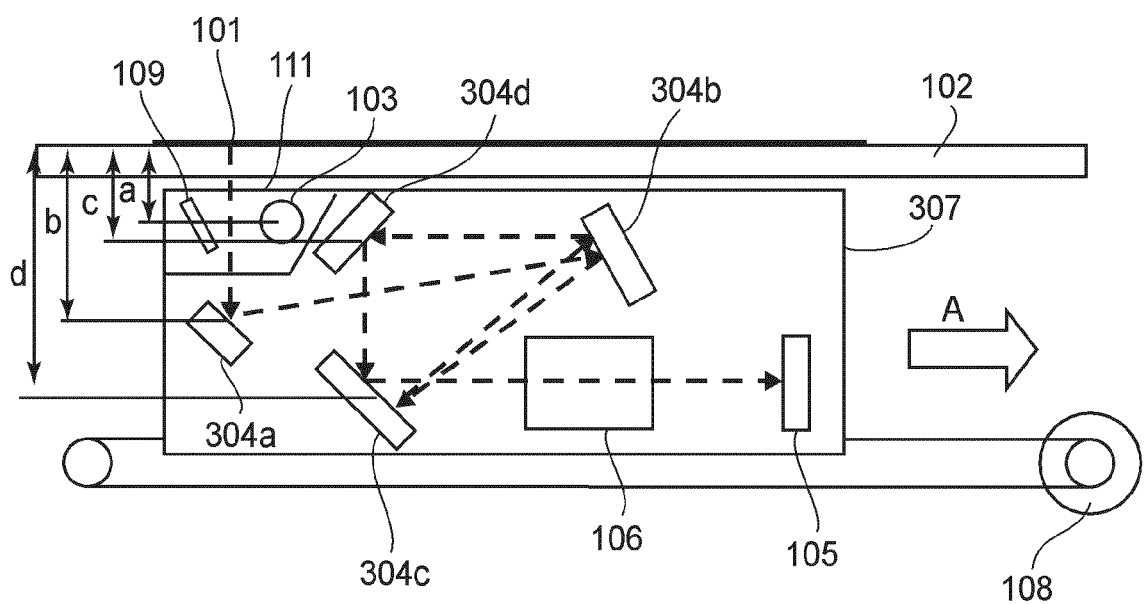
FIG. 4 is schematic diagram of a main portion of an image reading apparatus according to a third embodiment of the present invention.
Figure 5:
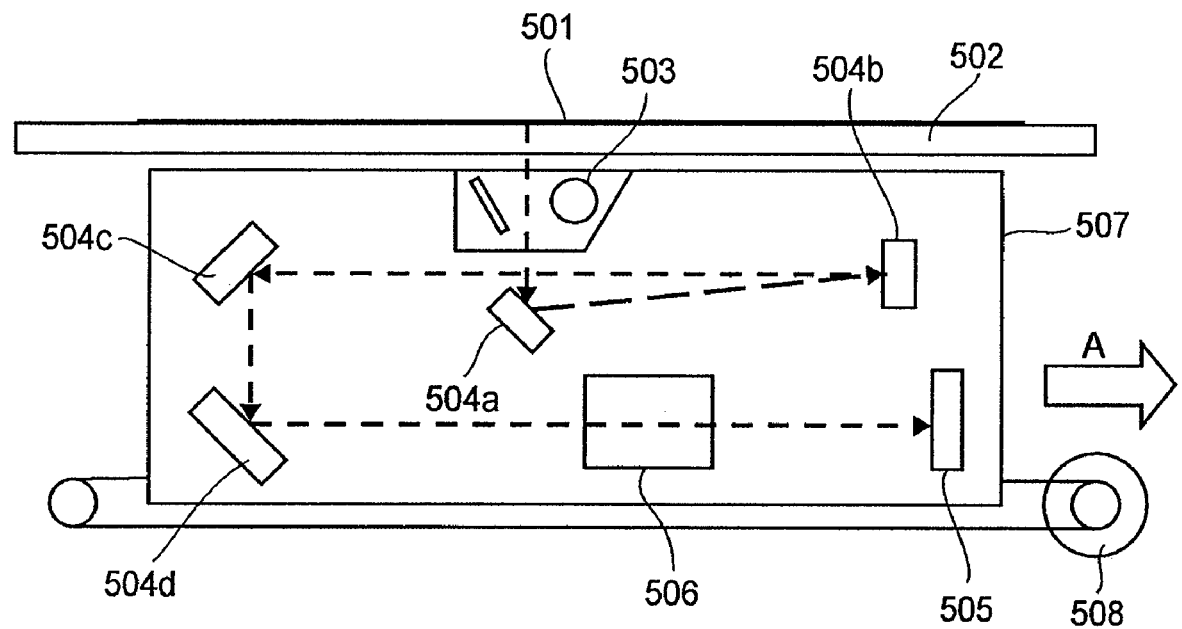
FIG. 5 is schematic diagram of a main portion of an image reading apparatus of conventional example.

FIG. 4 is a schematic diagram of a main portion of an image reading apparatus according to a third embodiment of the present invention. In this embodiment, the image reading apparatus of the present invention is applied to an image scanner. In FIG. 4, like numerals are assigned to components corresponding to those of FIG. 1.

The present embodiment differs from the abovementioned first embodiment in that the second mirror 304b and the third mirror 304c are comprised of a multiple-reflection mirror, and that the carriage 307 is structured by appropriately disposing the mirrors. Other structures and optical functions are similar to those of the first embodiment and, based on this, similar advantageous effects are obtainable.

In the present embodiment, the plural scanning mirrors include four mirrors of first, second, third and fourth mirrors 304a, 304b, 304c and 304d. In this embodiment, these mirrors are so disposed that the light beam from the original 101 is first reflected by the first mirror 304a and it is incident on the second mirror 304b afterwards, and that the light beam reflected by the second mirror 304b is incident on the third mirror 304c. Furthermore, these mirrors are so disposed that the light beam (principal ray) reflected by the third mirror 304c crosses the light path between the first mirror 304a and the second mirror 304b and, thereafter, it is incident again on the second mirror 304b. The light beam thus reflected by the second mirror 304b is incident on the fourth mirror 104d, and the light beam reflected by the fourth mirror 104d crosses the light path between the first mirror 304a and the second mirror 304b and, subsequently, it is incident again on the third mirror 304c. The light beam thus reflected by the third mirror 304c is incident on the imaging lens 106.

Furthermore, in this embodiment, among the plural mirrors, the first mirror 304a which is optically closest to the original surface 101 is disposed at the left-hand side end (end portion) of the carriage 307 with respect to the sub-scan section. Furthermore, the central portion of the reflection surface of the first mirror 304a is disposed, with respect to the vertical direction, in the space between (i) the central portion of the reflection surface of the third mirror 304c which is optically closest to the light entrance surface of the imaging lens 106 and in front of if and (ii) the central portions of the reflection surfaces of the second and fourth mirrors 304b and 304d.

Furthermore, in the present embodiment, the third mirror 304c and the imaging lens 106 are disposed physically further (lower) than the first, second and fourth mirrors 304a, 304b and 304d.

In the present embodiment, the light beam emitted from the illumination system 111 which includes light source means 103 placed at the left-hand end inside the carriage 307 and a mirror 109, illuminates the bottom face of the original 101. A portion of diffused light beams from the original 101 advances vertically downwardly (going down) as viewed in FIG. 4. The light beam advancing vertically downwardly is incident on the first mirror 304a disposed at the left-hand end of the carriage 307. The light beam incident on the first mirror 304a is reflected thereby at a predetermined angle, rightwardly of the carriage 307, and it is incident on the second mirror 304b which is placed at the right-hand end portion of the carriage 307. The light beam thus incident on the second mirror 304b is reflected thereby at a predetermined angle, leftwardly and downwardly of the carriage 107, and it is incident on the third mirror 304c which is placed at the lower left side of the carriage 307. The light beam incident on the third mirror 304c is then reflected thereby at a predetermined angle, upwardly and rightwardly of the carriage 107, and subsequently it is incident again on the second mirror 304b. The light beam thus incident on the second mirror 304b is reflected thereby at a predetermined angle, leftwardly of the carriage 307, and it is incident on the fourth mirror 304d which is disposed at the right-hand side of the light source means 103. The light beam thus incident on the fourth mirror 304d disposed at the right-hand side of the light source means 103 is reflected thereby at a predetermined angle, downwardly of the carriage 307, and it is incident again on the third mirror 304c.

The light beam incident on the third mirror 304c is reflected thereby horizontally with respect to the original surface 101, and then it is imaged on the line sensor 105 surface by the imaging lens 106. By moving the carriage 307 in the direction of an arrow A (sub-scan direction) shown in FIG. 4, the imagewise information of the original 101 is read.

In this embodiment, like the previously described first embodiment, the mirrors are disposed to satisfy the conditional expressions (1)-(4). In this embodiment, $\underline{a}$=7.7 mm, b=21.8 mm, c=13.0 mm and d=33.0 mm. If these values are substituted into the conditional expression (1)-(4), it follows that:

| | |
|---|---|
| a<c<b<d=7.7mm<13.0mm<21.8mm<29.0 mm | Conditional expression (1) |
| a/b=0.35 | Conditional expression (2) |
| a/d=0.23 | Conditional expression (3) |
| d=33.0mm | Conditional expression (4) |

Thus, all the conditional expressions (1)-(4) are satisfied.

Furthermore, in the present embodiment, the reflection surface of the first mirror 304a is disposed further from the original surface 101 in the sub-scan section, than the plane which contains the reflection surface of the third mirror 304c disposed at the lowermost portion of the carriage 307 is.

Hence, in accordance with the present embodiment as described above, in an image reading apparatus having such a carriage 307 as explained above, the disposition of components thereof including plural mirrors is set appropriately. Based on this, downsizing of the carriage 307, particularly, downsizing thereof with respect to the vertical direction, is accomplished. Also, downsizing of the overall system is achieved.

It is to be noted that the structure is not limited to those of the above-described embodiments and that, within the scope of the present invention as defined in the claims, the components of the integral scanning optical system unit may be changed in any way, with similar advantageous results as described above.

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 2006-243939 filed Sep. 8, 2006, for which is hereby incorporated by reference.

What is claimed is:

1. An image reading apparatus comprising:
light source means for illuminating a surface of an original;
a plurality of mirrors for reflecting a light beam from the original illuminated by said light source means;
reading means;
an imaging optical system for imaging a light beam reflected by said mirrors, upon said reading means; and
a scanning optical system unit which integrally accommodates said light source means, said mirrors, said reading means and said imaging optical system therein, said scanning optical system being configured to move in a sub-scan direction to read imagewise information of the original;
wherein, in a sub-scan section, one of said mirrors which is optically closest to the surface of the original is disposed in an end portion of said scanning optical system unit with respect to the sub-scan direction, as compared with the other mirrors, and
wherein, in the sub-scan section, a central portion of a reflection surface of said one of said mirrors which is optically closest to the surface of the original is disposed in a space between (i) a central portion of a reflection surface of one of said mirrors which is optically closest to said imaging optical system with respect to a direction orthogonal to a main-scan direction and the sub-scan direction of the surface of the original and which is disposed before a light entrance surface of said imaging optical system and (ii) a central portion of reflection surfaces of other mirrors; and
wherein said mirrors include a first mirror, a second mirror, a third mirror and a fourth mirror, and wherein said first to fourth mirrors are so disposed that, in the sub-scan section, a light beam from the original is reflected by said first mirror and is subsequently incident on said second mirror, that a light beam reflected by said second mirror is incident on said third mirror, that a light beam reflected by said third mirror crosses a light path between said first mirror and said second mirror and is subsequently incident on said fourth mirror, and that a light beam reflected by said fourth mirror is incident on said imaging optical system.

2. An image reading apparatus according to claim 1, wherein, in the sub-scan section, said fourth mirror and said imaging optical system are physically further from the surface of the original, with respect to a direction orthogonal to the main-scan direction and the sub-scan direction, than said first mirror, said second mirror and said third mirror are.

3. An image reading apparatus according to claim 1, wherein, in the sub-scan section, said fourth mirror and said imaging optical system are physically closer to the surface of the original, with respect to a direction orthogonal to the main-scan direction and the sub-scan direction, than said first mirror, said second mirror and said third mirror are.

4. An image reading apparatus comprising:
light source means for illuminating a surface of an original;
a plurality of mirrors for reflecting a light beam from the original illuminated by said light source means;
reading means;
an imaging optical system for imaging a light beam reflected by said mirrors, upon said reading means; and
a scanning optical system unit which integrally accommodates said light source means, said mirrors, said reading means and said imaging optical system therein, said scanning optical system being configured to move in a sub-scan direction to read imagewise information of the original;
wherein, in a sub-scan section, one of said mirrors which is optically closest to the surface of the original is disposed in an end portion of said scanning optical system unit with respect to the sub-scan direction, as compared with the other mirrors, and
wherein, in the sub-scan section, a central portion of a reflection surface of said one of said mirrors which is optically closest to the surface of the original is disposed in a space between (i) a central portion of a reflection surface of one of said mirrors which is optically closest to said imaging optical system with respect to a direction orthogonal to a main-scan direction and the sub-scan direction of the surface of the original and which is disposed before a light entrance surface of said imaging optical system and (ii) a central portion of reflection surfaces of other mirrors;
wherein, when, with respect to the sub-scan section, a physical distance from the surface of the original to a center of said light source means is denoted by a (mm), a physical distance from the surface of the original to a center of the reflection surface of one of said mirrors which is optically closest to the surface of the original is denoted by b (mm), a physical distance from the surface of the original to a center of the reflection surface of one of said mirrors which is physically closest to the surface of the original is denoted by c (mm), and a distance from the surface of the original to a center of the reflection surface of one of said mirrors which is physically furthermost therefrom with respect to a direction orthogonal to the main-scan direction and the sub-scan direction is denoted by d (mm), said mirrors are disposed to satisfy the following relations:

$a<c<b<d$ $0.3<a/b<0.4$ $0.2<a/d<0.3$ $d<35.0mm.$

5. An image reading apparatus according to claim 4, wherein, in the sub-scan section, the reflection surface of said one of said mirrors which is optically closest to the surface of the original is disposed physically further from the surface of the original, than a plane which contains the reflection surface of one of said mirrors which is physically furthermost from the surface of the original with respect to a direction orthogonal to the main-scan direction and the sub-scan direction is.

* * * * *